United States Patent Office 3,454,673
Patented July 8, 1969

3,454,673
PREPARATION OF HARDENABLE NITROGEN CONTAINING SYNTHETIC RESINOUS PRODUCTS
Karl Schmidt, Hamburg, and Hans Dannenbaum, deceased, late of Ahrensburg, Germany, by Ella Dannenbaum, heir, born Supply, Ahrensburg, Germany, assignors to Dr. Beck & Co. G.m.b.H., Hamburg, Germany
No Drawing. Filed June 1, 1966, Ser. No. 555,212
Claims priority, application Germany, June 5, 1965, B 82,293
Int. Cl. C08f *21/00;* C08g *17/14, 17/18*
U.S. Cl. 260—868                              25 Claims

ABSTRACT OF THE DISCLOSURE

A process for preparing a hardenable nitrogen containing condensation product including the step of modifying an unsaturated polyester which is soluable in and co-polymerisable with unsaturated monomers with one or more monobasic carboxylic acids and/or monohydric hydroxy compounds, containing at least one 5- or 6- membered imide ring, and having the general structures:

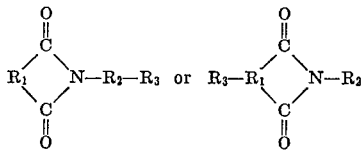

where $R_1$ is a divalent or trivalent aliphatic, cyclic or aromatic residue to which the anhydride groups are attached at the 1,2-, 1,3-, or peri-positions; $R_2$ is a monovalent or divalent aliphatic or cycloaliphatic residue or an aryl residue; and $R_3$ is a monovalent active monofunctional residue capable of linking with free COOH, OH or NH groups of the unsaturated polyester.

---

This invention relates to the preparation of hardenable nitrogen containing synthetic resinous products.

It is well known that for electrical insulation purposes it is possible to employ unsaturated polyesters which have been dissolved in a co-polymerisable unsaturated monomer. By effecting co-polymerisation using specific catalysts, preferably organic peroxides, and by employing elevated temperatures such a mixture can be converted to a highly viscous, solid end product which ranges from the ductile to hard in its hardness, and has good insulating properties.

The processes for manufacturing the unsaturated polyesters are well known. The starting compounds used are, for example, unsaturated dicarboxylic acids such as maleic acid, fumaric acid, citraconic acid, and itaconic acid; saturated dicarboxylic acids, such as succinic acid, adipic acid and phthalic acid; dihydric alcohols, for example alkylene glycols, such as ethylene glycol and propylene glycol, and the lower or higher molecular polyethers of the alkylene glycols.

Besides the divalent compounds, it is also possible to use monovalent and polyvalent compounds such as citric acid, benzene tricarboxylic acids, benzoic acid, simple or polymeric fatty acids, lower or higher aliphatic mono-alcohols or polyols, hydroxycarboxylic acids, halogen-containing acids, ethylation or propoxylation products of glycols, triols, phenols, cylic compounds of the most varied kinds, e.g. dimethylol compounds, alicyclic ring compounds, perhydro-, mono- or polyhydric, mono- or polycyclic phenols, epoxy compounds, anhydrides, cylic acetals and so on. Finally, it is even possible, other than compounds which contain carbon, hydrogen and oxygen and possibly also halogen, to some extent to use compounds containing what are known as hetero-atoms, in particular compounds containing nitrogen, provided that these compounds have one or more functional groups which enable them to be incorporated into polyesters. Examples of these are chain or cyclic amines, amino-alcohols and amino-acids or their reactive derivatives.

As the unsaturated polyesters, preferably a kind is used which contain as their essential constituents residues of monobasic or polybasic carboxylic acids, mono- or polyhydric hydroxy compounds and possibly also residues of mono- or multivalent primary amino compounds, at least some of these residues containing unsaturated polymerisable groups. Furthermore, these unsaturated polyesters should be soluble in co-polymerisable unsaturated monomers.

As the co-polymerisable monomers, it is possible to employ monomers such as styrene, its homologs and substitution products, also allyl, vinyl, acrylic acid or methacrylic acid esters, if desired, together with other co-polymerisable compounds, such as unsaturated ethers or hydrocarbons.

It is an object of the present invention to provide a process for preparing hardenable nitrogen-containing synthetic resinous products of this type having improved properties.

According to the invention, there is provided a process for preparing a hardenable nitrogen containing condensation product including the step of modifying an unsaturated polyester which is soluble in an co-polymerisable with unsaturated monomers with one or more monobasic carboxylic acids and/or monohydric hydroxy compounds, containing at least one 5- or 6-membered imide ring, and having the general structures:

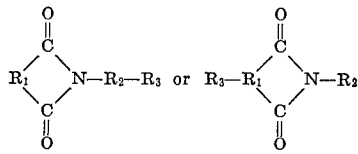

where $R_1$ is a divalent or trivalent aliphatic, cyclic or aromatic residue to which the anhydride groups are attached at the 1,2-, 1,3-, or peri-positions; $R_2$ is a monovalent or divalent aliphatic or cycloaliphatic residue or an aryl residue; and $R_3$ is a monovalent active monofunctional residue capable of linking directly or indirectly with free COOH, OH or NH groups of the unsaturated polyester.

Preferably, the unsaturated polyester contains as essential constitutents residues of one or more mono- and/ or polybasic carboxylic acids, one or more mono- and/or polyhydric hydroxy compounds containing aliphatically bonded hydroxy groups, and optionally one or more mono- and/or polyfunctional primary amino compounds, at least some of said residues containing one or more unsaturated polymerisable groups.

Preferably, the residue $R_3$ is a COOH—, or OH— group or an ester-forming derivative thereof.

The imide compounds employed in accordance with the invention are preferably formed from dicarboxylic or polycarboxylic acid anhydrides or imide-forming derivates thereof, and from a compound containing at least one primary amino group, either the polycarboxylic acid anhydride or the amino compound containing the requisite further carboxylic acid or hydroxy group or ester-forming derivative thereof. A straightforward example of this class of compound is constituted by the compound of the formula

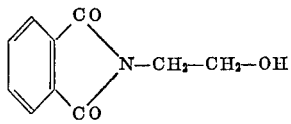

obtained from phthalic acid anhydride and monoethanolamine. The imides employed in accordance with the invention may also, however, be derived, for example, from glutaric acid or from partially hydrogenated derivatives of o-phthalic acid, or derivatives of o-phthalic acid having complicated structures, e.g. from halogenated phthalic acid anhydrides (tetrachloro- or tetrabromophthalic acid anhydride), or from alkylated or hydrogenated systems (methyl-, tetrahydro-, hexahydro-, methylhexahydro-, endomethylene tetrahydro phthalic acid anhydride). Furthermore, the imides may be derived from maleic acid, citraconic acid, succinic acid or derivates thereof, and their derivates, or again from the addition products of maleic acid or citraconic acid with other olefinic compounds, e.g. with conjugated fatty acids or esters thereof, with dicyclopentadiene, with aromatic hydrocarbons, with unsaturated ketones, with diolefines and with polyolefines. The imides may also, however, be derived from compounds, such as trimellitic acid anhydride, for example, which when reacted with a suitable amine, such as monobutylamine, produce a compound in which the residue $R_3$ is represented by the carboxy group carried by the aromatic ring, as shown in the following Formula $b$:

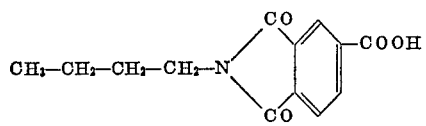

The Formulae $c$ and $d$ below show imide compounds which have been produced from the anhydrides of naphthalene-1,8 dicarboxylic acid (naphthalic acid) and naphthalene-1,2-dicarboxylic acid, respectively.

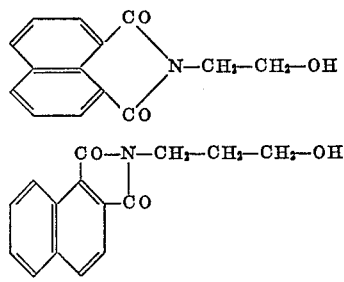

The Formulae $e$ to $l$ given below illustrate further possible variations on the basic use of trimellitic acid, pyromellitic acid, or benzophenon-tetracarboxylic acid mono- or dianhydrides.

In the case of pyromellitic acid, it is even possible that a double imide system may develop. However, the imides may also be derived from the diesters corresponding to the anhydride component, provided that these diesters, like the anhydrides, are capable of imide formation with primary amino groups.

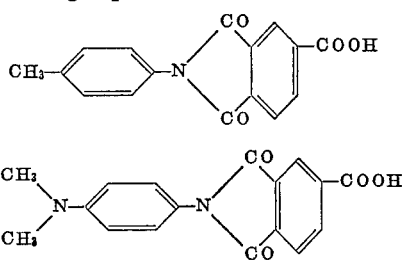

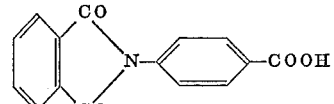

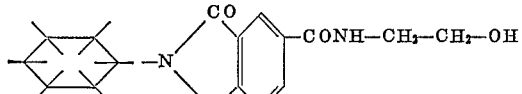

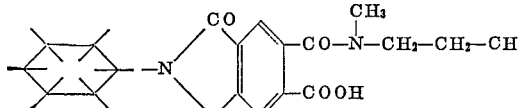

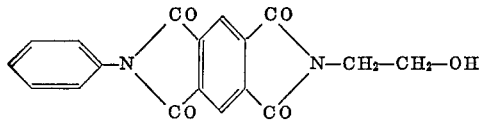

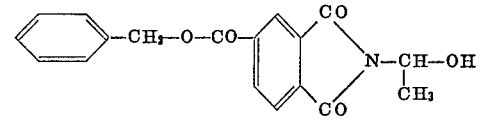

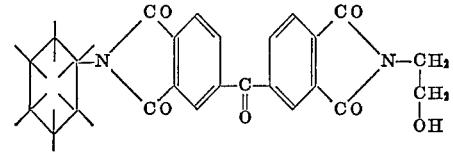

As the amine component from which the imides of the invention are derived, there may be used, not only the simple ethanolamine, but also amino compounds of the most varied kind, such as the isomeric propanol- or butanolamines or other higher homologues, nuclear-aminated phenylethyl alcohols, amino-carboxylic acids and nuclear aminated ethoxylation products of phenols.

Instead of the free amino carboxylic acids, obviously it is equally possible to use the corresponding esters, as the following Formulae $m$ and $n$ indicate:

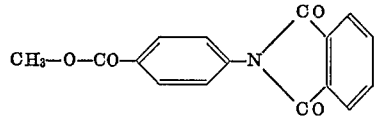

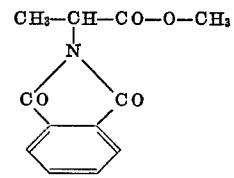

These and similar compounds, can be obtained in a conventional manner by heating or simply by moderate warming of the components in solution or in molten form, and can in many cases be isolated in the form of well-crystallised compounds.

The modification of the unsaturated polyester can be achieved in the following ways:

(1) The monofunctional compound containing the imide ring can be used as a crude material or in a purified form, being reacted like an ordinary monofunctional compound with the components necessary for the manufacture of the unsaturated polyester.

(2) The monofunctional compound containing the imide ring is produced in the presence of a pre-condensed (but not yet completely condensed) unsaturated polyester, which still contains free OH— or COOH-groups, by condensation of the appropriate anhydride and appropriate amine, and the product thus obtained, in which the imide ring is located, is then condensed by changing the reaction conditions, and, where the final unsaturated polyester is to contain maleic acid or like residues, the maleic acid component is added only after actual formation of the imide compound.

(3) The pure or crude monofunctional compound containing the imide ring is reacted with the finished, previously produced polyester, which still contains OH, COOH or NH groups, in order to block the still free end groups.

(4) The free hydroxy groups of the unsaturated hydroxy polyester are first of all reacted with an excess of a polyisocyanate, e.g. a diisocyanate, in accordance with the following equation:

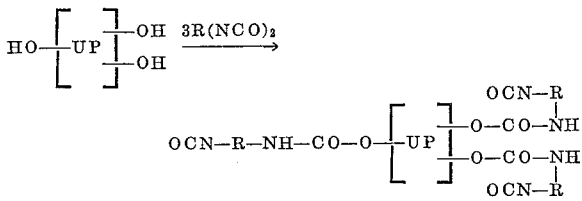

and then the still active NCO groups are allowed to react with an imide ring containing compound which contains a hydroxy group (UP signifies unsaturated polyester and R indicates an aliphatic, cycloaliphatic or aromatic residue or an isocyanuric acid ester residue). An imide ring containing compound of the kind used in accordance with the invention, containing a hydroxy group, is first reacted with an excess of a polyisocyanate, e.g., a diisocyanate, in accordance with the following equation:

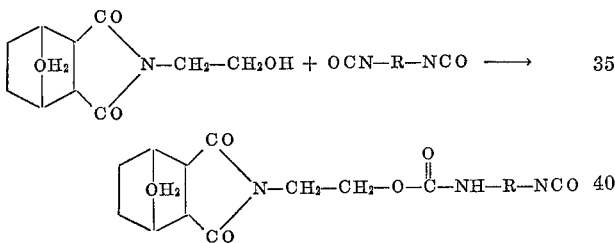

and the product of this is then reacted with an unsaturated hydroxy polyester. In the above equation, the residue R is as defined in paragraph (4) above.

The widely differing imide ring containing compounds used in accordance with the invention have a whole series of to some extent unexpected functions when included in unsaturated polyester systems. Apart from the fact that purely from the starting material point of view they considerably broaden the possibilities of synthesis and serving to form a monofunctional end group they are decisive in determining the chain length, the molecular weight, the molecular structure and therefore that very important factor, the viscosity, they also exert a considerable influence upon the softening point of the unsaturated polyester itself, a factor which can be considerably raised, and upon the solubility of the resultant condensation product. Also, in a totally unforeseen way, they influence the co-polymerization between unsaturated polyester and the comonomer or comonomers, i.e. the hardening properties of the system, and in most cases they considerably increase the thermal resistance of the overall system, which manifests itself in the form of an enhanced long-term heat resistance, lower material loss, greater ageing resistance, better leakage current resistance and lower dielectric losses. Thus, overall, there is a significant degree of stabilisation of the overall system in the hardened state. It is precisely this which is a critical factor in the use of the unsaturated polyester systems of the invention, in the field of insulating materials. Over and above this, there are yet other unexpected effects such as the generally better through-drying of thin films when hardening takes place, and the improved anti-yellowing properties in systems containing brightly coloured pigment.

Over all, the introduction of end groups containing imide-rings, coupled with carefully considered and tested exploitation of the very numerous possibilities of synthesis to which this gives rise, means a considerable possibility for expansion and improvement in systems of the kind which would find application in the electrical engineering field.

The invention is illustrated by the following more limitative experiments and examples.

EXPERIMENTS TO ILLUSTRATE THE MANUFACTURE OF IMIDE RING CONTAINING COMPOUNDS

Experiment 1

The production of N-oxyethyltetrachlorophthalimide.— 290 g. of tetrachlorophthalic anhydride are introduced in large batches into 61 g. of monoethanolamine. The temperature of the mixture rises to 130° C. in the course of an exothermic reaction, and at this point it initially solidifies. Further heating to between 240 and 250° C. is carried out and this triggers off the splitting off of the calculated quantity of water (a theoretical 18 ml.). When this process ceases, the mass is allowed to cool. It solidifies in a crystalline form at 250° C. and can then be employed directly, without further purification, for further reaction.

Experiment 2

Production of N hydroxyethylphthalimide.—148 g. of phthalic anhydride are introduced in batches into 61 g. of monoethanolamine, and the mixture initially rises in temperature to 140° C., whilst giving off heat. With further heating to around 200° C., approximately 18 ml. of water are split off and when this process ceases, the melt is allowed to cool (solidification point 150° C.). This crude product is sufficiently pure for further reaction.

Experiment 3

Production of N-hydroxyethyltetrahydrophthalimide.— 61 g. (1 mol) of monoethanolamine are introduced into a three-necked flask equipped with a stirrer and a descending condenser and riser pipe, and reacted in batches with tetrahydrophthalic acid anhydride at such a rate that the spontaneous temperature rise initialy remains below 100° C. throughout. Only when this has been done, is heating at 200° C. carried out for one hour and at this stage the expected 18 ml. of water of condensation distill off. The resultant imide solidifies in the cooled flask at between 70 and 72° C. By effecting multiple recrystallization, the pure product is obtained in the form of a white crystalline powder of F.P. 86° C.

Experiment 4

Production of N-ethanolnaphthalic acid imide.—20 g. of naphthalic acid anhydride and 6 g. of ethanolamine (mol ratio 1:1) are mixed together and the mixture heated to 80° C.; this results initially in the formation of the semi-amide, melting taking place and heat being given off. By further strong heating to between 180–200° C., ring formation to produce the desired imide takes place, the water of reaction being split off at the same time. The resultant ethanolnaphthalic acid imide is a light brown crystalline mass.

Experiment 5

Production of N - hydroxyethylendomethylenetetrahydrophthalimide.—61 g. of monoethanolamine and 184 g. of endomethylenetetrahydrophthalic anhydride (the latter added in batches), are progressively reacted with one another, initially at a temperature below 130° C. Initially, a crystalline mass which melts at about 120° C. is formed. This is further heated to 200° C. and maintained at this temperature until splitting off of the calculated quantity of water (18 g.) has been completed. Cooling is then allowed to take place and themelt is poured into a flat dish, where it solidifies. When recrystallisation from alcohol is carried out, the product is in the form of white crystals which melt at 96° C. The yield in terms of crude product is theoretical.

Experiment 6

Imide from trimellitic anhydride and aniline.—150 g. of trimellitic anhydride and 300 g. of aniline are reacted together, the procedure being that the previously heated aniline is slowly fed into the finely powdered trimellitic acid anhydride at the rate of dissolution, stirring and heating being carried out the while. The additive proportion is further heated as this happens and a boiling stage may be reached, coupled with temporary precipitation of a yellow crystalline mass. However, heating is continued until finally a clear melt is obtained and the calculated quantity of water (14 g.) has been split off. The substance is then allowed to cool down, being at the same time stirred and the friable product is introduced in batches into diluted cold excess HCl where any surplus aniline goes into solution. The yellowish-white deposit is crushed in the presence of the aqueous acid, rubbed down, separated and washed with copious quantities of water. The pressed and air dried cakes of this material are recrystallised from glacial acetic acid, and the purified material is washed with acetone. The yield is merely quantitative (200 g.).

Example 1

195 g. of the n-hydroxyethyltetrahydrophthalimide produced in accordance with Experiment 3 (1 mol), together with 98 g. of maleic acid anhydride (1 mol), 45 g. of trimethylolpropane (⅓ mol) and 0.1 g. of crystallised hydroquinone, are first melted in one of the usual condensing flasks, in a carbon dioxide protective atmosphere, and gradually heated to 200° C. After three hours, a vacuum of 100 mm./Hg is produced (still with the $CO_2$ protective atmosphere present) and is maintained for one hour. Thereafter, the acid number has dropped to about 40. The product is allowed to cool down to 80° C. and 106 g. of monostyrene are added. This results in the smooth dissolution of the reaction product, and in the formation of a clear brown solution.

A sample of the reaction product obtained, which has been mixed with 1% of tertiary butyl periso-octanate and 0.5% of a 10% cobalt naphthenate solution, was found to harden within three minutes on a steel plate at 120° C., to a completely dry and very hard product, which adhered very strongly even in the heated state and at the same time had a considerable mechanical strength in this same state.

When activated with 0.5 to 1% of a 10% cobalt naphthenate solution and 2% of a 40 to 50% solution of methyl ethyl ketone peroxide in dimethyl phthalate, the same product hardened with a few hours to a completely dry state even in the cold (at room temperature) and even when applied in thin films painted on the steel plates.

Mixtures of the same end product with fillers such as a combination of kaolin, ground mica and asbestos fibre, with the addition of 0.5% of calcium stearate as lubricant and with the addition also of 2% dibenzolyl peroxide paste as hardener, can be moulded at temperatures above 100° C., e.g. between 120°–130° C. to form extraordinarily strong mouldings which are solid even at the moulding temperature.

EXAMPLE 2

|  | Mols | Grams |
|---|---|---|
| Naphthalic acid anhydride | 1.5 | 297 |
| Monoethanolamine | 1.5 | 92 |
| Glycerine | 0.75 | 68 |
| 2,2-dimethylpropandiol-1,3 | 0.75 | 78 |
| Fumaric acid | 2.25 | 261 |
| Hydroquinone, crystalline | | 0.2 |
| | | 796.2 |

The monoethanolamine is placed in a 1 l. round three-necked flask equipped with stirrer, $CO_2$ line, vacuum line, reflux condenser, water separator and contact thermometer, and the naphthalic acid anhydride is added in batches with stirring. The temperature of the mass rises spontaneously to about 70 to 80° C. Then, glycerine and dimethylpropandiol are added, and heating and stirring are carried out simultaneously, the carbon dioxide protective atmosphere being present, initially to 150° C. and thereafter to 180° C. and in this way rapid separation of the water of condensation together with complete formation of the imide is achieved. Heating is then continued, the fumaric acid and the hydroquinone introduced, the air completely dispelled by the introduction of carbon dioxide gas and heating maintained at between 180 and 200° C. until, further water being split off, the acid number has dropped to about 40. At this point (a weak inflow of $CO_2$ being maintained) a partial vacuum of about 300 mm./Hg is created, and this is increased after about half an hour, to between 20 and 25 mm./Hg. Temperature and vacuum are maintained until a sample of the melt has an acid number of no greater than 30. Cooling is then allowed to take place and at 90° C. as much styrene is added as is needed to produce a solution (suspension) having a 25% styrene content.

100 g. of this solution mixed with 0.5 g. of a 10% cobalt octoate solution and 1 g. of a 90% solution of tertiary butyl periso-octanate, harden at 120° C. to completely dry, very strong products, even when applied in very thin films, which products after even as little as 4 to 5 minutes of heating are tough and hard. If a mixture activated in this way is mixed with a suitable filler mixture, e.g. dry calcium carbonate and glass fibre of 12–25 mm. length, and if this mixture is moulded for a few minutes at 130° C. then mouldings having good insulating properties are obtained, which are very strong and extremely useful in mechanical and electrical applications.

EXAMPLE 3

|  | Grams | Mols |
|---|---|---|
| Tetrachlorophthalic acid anhydride | 576 | 2 |
| 1-aminopropane-3-ol | 150 | 2 |
| Trimethylolpropane | 175 | 1.25 |
| Maleic anhydride | 245 | 2 |
| Diallylphthalate | 250 | 1 |

The three first-mentioned constituents are reacted with one another under a protective atmosphere of inert gas, the anhydride being introduced in batches into the slightly heated amine. With the resultant spontaneous heating, a liquid, yellowish, lumpy melt is first produced which solidifies again and is still solid at 130° C. although at a yet higher temperature it becomes liquid again and on heating to between 200 and 220° C. liberates practically all the theoretical quantity of 36 g. of water.

The maleic acid anhydride is now added, together with 0.2 g. of crystallised hydroquinone, and the mixture held at 210° C. for an hour whereafter a vacuum of 300 mm./Hg is applied, inert gas still being introduced. After a further half hour, condensation is completed. Cooling is allowed to take place and at a temperature below 100° C. the diallyl phthalate is added to the melt.

A sample of the clear brown solution, when activated in accordance with Examples 1 or 2 and tested on a heated plate, yields a tough, clear, dry film which retains considerable strength even in the heated state.

Example 4

928 g. of tetrabromophthalic acid anhydride (2 mol), 0.2 g. of crystalline hydroquinone and 500 g. of xylene are heated together to 140° C. and then 178 g. (2 mols) of 1-aminobutane-4-ol are introduced gradually in droplet fashion with stirring, this latter process being spread over a period of two hours. This leads to the separation of about 36 g . of water along with the xylene vapour. Subsequently, 196 g. (2 mol) of maleic anhydride are introduced and the temperature raised from 120 to 150° C., whereafter the temperature is allowed to drop to 140° C. at which point 800 g. of (4,4'-dioxy-3,5,3'5'-tetrabromodiphenylpropane)-bis-glycidyl-ether (1 mol) are introduced and heating at 140–150° C. carried out for a period of one hour.

After about two hours of heating, the temperature is raised slowly to 200° C. and the vacuum applied, under which conditions xylene is distilled off. Over all, after further xylene has been added, about 500 ml. of distillate are obtained. The non-volatile condensation product is a brown resin which is tough even in the hot state, being poured in molten form into flat aluminium trays where it is allowed to solidify. In the cold state, it is brittle and can be ground; when finely ground, it dissolves in monomers, e.g. styrene, and such solutions, when provided with catalysts in accordance with Examples 1 to 3, yield hard, dry, glossy films which develop very rapidly at 120° C. When activated with methyl ethyl ketone peroxide and cobalt solution as in Example 1, it is suitable for use as a cold-setting casting resin which also has extraordinarily high thermal stability.

Example 5

410 g. of N-hydroxyethylendomethylenetetrahydrophthalic acid imide (2 mol) produced in accordance with experiment 5, 348 g. of fumaric acid (3 mols) and 76 g. of 1,2-propandiol (1 mol) are heated gradually to 100° C., whilst 0.2 g. of crystalline hydroquinone are added, in the presence of a protective atmosphere of carbon dioxide, at which temperature they are maintained for six hours. 155 ml. of water distill off. The process of splitting off of the water is terminated by the brief application of a vacuum, the melt is allowed to cool to below 100° C. and the product is dissolved by the addition of 200 g. of styrene, to give a clear, brown varnishlike solution.

A cool sample is initially stabilised with 0.5% of solid benzoquinone, and then activated by the addition of 0.1% of a 10% cobalt octoate solution and 1% of a 90% solution of tertiary butyl periso-octoate. This mixture sets hard on a steel plate at 120° C., within the space of two minutes, to form a glossy, firmly adhering, dry film, which is still unusually hard even in the heated state. Pieces of glass-silk impregnated with the mixture and then moulded into a block, yield, after only a brief hardening at 130° C., an extremely solid and hard laminate material, which does not distort even when heated and is tracking resistant.

Example 6

800 g. of an unsaturated polyester produced in accordance with Example 7 and having an OH-equivalent of 500, are esterified together with 400 g. of the imide (produced in accordance with experient 6) of trimellitic acid anhydride and aniline, using the usual precautions (carbon dioxide, and an inhibitor in the form of 100 mm. of hydroquinone), at a temperature between 150–210° C. (rising by 20° C. per hour), the residual water split off during reaction being finally moved by gradual application of vacuum. The heating is continued until the cleared mass has an acid number of less than 20, whereafter cooling to 80° C. is allowed to take place under vacuum and the viscous melt is dissolved first of all in 200 g. of diallyl phthalate and then in 400 g. of styrene.

A sample, activated in accordance with Example 1 and hardened at 120° C., yields a hard yellow synthetic resin, which softens but little when heated and has good tracking resistance. Yield: 1720 g.

Example 7

Isocyanate-combination.—In a two litre three necked electrically heated reaction flask, equipped with a reflux condenser, stirrer, nitrogen feed and contact thermometer, 210 g. of toluylene diisocyanate are introduced and heated to between 40 and 50° C. Atmospheric moisture and air (the atmosphere being dry nitrogen) being excluded, a warm solution of 245 g. of the imide obtained from 1 mol of tetrahydrophthalic acid anhydride and 1 mol of 1-amino propanol-3 in 300 g. of styrene, are added over a period of one hour, vigorous stirring being carried out the while and the spontaneously heated mixture being maintained at a temperature of no more than 90° to 100° C. The imide styrene mixture added in droplet fashion has added to it 400 mg. of solid benzoquinone as inhibitor. After this addition has been completed, heating is continued for a further half hour and thereafter a preheated mixture of 145 g. of styrene and 600 g. of an unsaturated polyester of OH equivalent weight 500, is added, this mixture having been previously prepared from 2.5 mols of maleic anhydride, 1.5 mols of phthalic anhydride, 2 mols of 1,2-propandiol and 2.2 mols of 1,2,5-hexanetriol by the usual condensation process carried out at 200–210° C. over a period of a few hours, finally under increased vacuum and at all times with the exclusion of air. The addition of the polyester is spread over a half-hour period and the temperature maintained at 90° C. After this process, the temperature is maintained at 90° C. for a further half hour and cooling then allowed to take place, this being followed by degassing at about 30° C. by a brief application of vacuum. The completely cooled content of the flask is then put into a well-sealed vessel and allowed to stand overnight. In the morning, a clear, yellow viscous solution of the polyester (modified with urethane and imide groups) has formed, which, after the addition of hardeners and activators, for example, in accordance with Example 1, hardens in the heated state to a clear hard resin which has very little flexibility even in the heated state and has good tracking resistance (Stage T–5). The yield is virtually 100%, i.e. around 1500 g.

What is claimed as the invention and desired to secure by Letters Patent of the United States is:

1. A process for preparing a hardenable nitrogen containing condensation product including the step of modifying an unsaturated polyester which is soluble in and co-polymerisable with unsaturated monomers with one or more mono-basic carboxylic acids and/or monohydric hydroxy compounds, containing at least one 5- or 6-membered imide ring, and having the general structures:

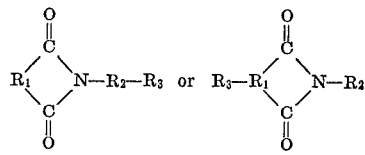

where $R_1$ is a divalent or trivalent aliphatic, cyclic or aromatic residue to which the anhydride groups are attached at the 1,2-, 1,3-, or peri-positions;

$R_2$ is a monovalent or divalent aliphatic or cycloaliphatic residue or an aryl residue; and $R_3$ is a monovalent active monofunctional residue capable of linking with free COOH, OH or NH groups of the unsaturated polyester.

2. A process as claimed in claim 1 wherein said polyester contains as essential constituents residues of one or more mono- and/or polybasic carboxylic acids, one or more mono- and/or polyhydric hydroxy compounds containing aliphatically bonded hydroxy groups, and optionally one or more mono- and/or polyfunctional primary amino compounds, at least some of said residues containing one or more unsaturated polymerisable groups.

3. A process as claimed in claim 1 wherein $R_3$ is a COOH or OH group, or an ester-forming derivative thereof.

4. A process as claimed in claim 1 wherein said imide ring containing compound is formed from a dicarboxylic or polycarboxylic acid anhydride, or an imide-forming derivative thereof and a compound containing at least one primary amino group, either the anhydride or the amino-group containing compound containing the residue $R_3$.

5. A process as claimed in claim 4 wherein said anhydride is O-phthalic anhydride, or a partially or completely hydrogenated phthalic anhydride, or a phthalic anhydride containing as substituents one or more halogen atoms, or one or more oxygen- or nitrogen-containing groups, or one or more aryl or alkyl groups, if desired through a bridging atom or group.

6. A process as claimed in claim 4 wherein said anhydride is an addition product of an $a, \beta$- unsaturated dicarboxylic acid anhydride and an olefinic compound.

7. A process as claimed in claim 6 wherein said dicarboxylic acid anhydride is maleic anhydride or itaconic acid anhydride.

8. A process as claimed in claim 4 wherein said anhydride is trimellitic acid anhydride, or hemimellitic acid anhydride, or pyromellitic acid dianhydride or benzophenone tetracarboxylic acid dianhydride.

9. A process as claimed in claim 4 wherein said amino compound is an amino-alcohol, or an amino-carboxylic acid or ester thereof.

10. A process as claimed in claim 1 wherein said imide ring-containing compound is reacted with the components required for the manufacture of said unsaturated polyester.

11. A process as claimed in claim 4 wherein said imide ring containing compound is formed from the appropriate anhydride and the appropriate amino compound in the presence of a partially condensed unsaturated polyester which still contains free COOH, OH, or NH groups, and is thereafter condensed with said polyester.

12. A process as claimed in claim 1 wherein said imide ring-containing compound is reacted with an unsaturated polyester which still contains OH, COOH or NH groups.

13. A process as claimed in claim 1 wherein the residue $R_3$ of the imide-ring containing compound is a hydroxy group and is linked to a free hydroxy group of the unsaturated polyester by means of a polyisocyanate.

14. A process as claimed in claim 13 wherein the unsaturated polyester is first reacted with said di- or poly-isocyanate and the product is thereafter reacted with said imide-ring containing compound.

15. A process as claimed in claim 13 wherein said imide-ring containing compound is first reacted with said di- or poly-isocyanate and the product is thereafter reacted with said unsaturated polyester.

16. A process for preparing a hardenable nitrogen-containing condensation product substantially as hereinbefore described with reference to any one of Examples 1 to 7.

17. A hardenable nitrogen containing condensation product prepared by a process as claimed in claim 1.

18. A hardenable composition comprising a solution of a hardenable nitrogen-containing condensation product as claimed in claim 17 in a monomer copolymerisable therewith or a mixture of such monomers.

19. A hardenable composition as claimed in claim 18 including one or more hardening catalysts.

20. A hardenable composition as claimed in claim 19 wherein said catalyst or one of said catalysts is a per compound.

21. A hardenable composition as claimed in claim 18 including one or more fillers.

22. A hardenable composition substantially is hereinbefore described with reference to any one of Examples 1 to 7.

23. A hardened synthetic resinous material prepared by hardening a hardenable composition as claimed in claim 18.

24. Electrical conductor having as an insulating film a hardened synthetic resin according to claim 23.

25. Process according to claim 1, wherein said modification is joining to the polyester cyclic imide groups obtained from a condensation reaction of monofunctional cyclic imide with free COOH, OH or NH groups on the polyester.

References Cited
UNITED STATES PATENTS

| 2,743,260 | 4/1956 | Tawney | 260—868 |
| 2,777,830 | 1/1957 | Shivers | 260—75 N |
| 3,238,181 | 3/1966 | Anderson | 260—75 N |

MURRAY TILLMAN, *Primary Examiner.*

J. T. GOOLKASIAN, *Assistant Examiner.*

U.S. Cl. X.R.

117—128.4; 260—76, 77, 857